Patented Aug. 31, 1943

2,328,424

UNITED STATES PATENT OFFICE 2,328,424

UREA-TRIAZINE RESIN

Gaetano F. D'Alelio, Pittsfield, Mass., assignor to General Electric Company, a corporation of New York No Drawing. Application December 23, 1940, Serial No. 371,393

17 Claims. (Cl. 260—42)

This invention relates to the production of new and useful synthetic compositions. More particularly the invention is concerned with novel synthetic resins obtained by reaction of "an aminotriazine," for example melamine, and a preformed poly-(N-carbinol) derivative of "a urea," for example preformed dimethylol urea and thiourea, preformed dimethylol derivatives of substituted ureas and thioureas, etc.

By the term "an aminotriazine" as used generally herein is meant a triazine containing either at least one unsubstituted amidogen group or a plurality of partly substituted amidogen groups. (As shown by its dictionary definition, "amidogen" means the radical —NH₂ which is known only in combination in amides and amines.) Of course the aminotriazine may contain one or more unsubstituted amidogen groups and, also, one or more partly substituted amidogen groups. The only requisite of the aminotriazine is that it contain at least two active hydrogen atoms in one or more amidogen groups. These hydrogen atoms may be present either in the form of one or more —NH₂ groups or in the form of two or more —NHR groups, where R represents a monovalent substituent.

By the term "a urea" as used generally herein is meant not only urea itself but also substituted ureas and their equivalents containing at least two active hydrogen atoms, more particularly compounds containing at least one hydrogen atom attached directly to each amide nitrogen.

A preformed poly-(N-carbinol) derivative of a urea may be described more definitely as a urea containing at least two N-carbinol groups. An N-carbinol grouping may be described more specifically as a grouping containing the essential unit

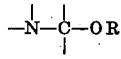

where R represents hydrogen or a monovalent organic radical, more particularly a substituted or unsubstituted hydrocarbon radical.

It has been known heretofore that resinous materials can be prepared by effecting reaction between an aminotriazine and an aldehyde, e. g., formaldehyde, and it also has been suggested that such reaction may be carried out in the presence of other aldehyde-reactable compounds, e. g., urea. The suggestion also has been made that resinous compositions might be produced by appropriate heat treatment of preformed monoor di-methylol urea. However, to the best of my knowledge and belief no resins produced by mere heat treatment of such preformed ureas have had the properties necessary to render them of any commercial value.

The present invention is based on my discovery that resinous products having particularly valuable properties can be produced by effecting reaction between an aminotriazine and a preformed poly-(N-carbinol) derivative of a urea. The reaction may be carried out under acid, neutral or alkaline conditions, at normal or at elevated temperatures, and at atmospheric, sub-atmospheric or super-atmospheric pressure. These new materials are characterized by their high resistance to water as compared with the ordinary resinous condensation products of an aminotriazine, a urea and an aldehyde, more particularly a melamine-urea-formaldehyde resin. Furthermore, the potentially reactive resinous syrups and molding compounds prepared therefrom have excellent time- or storage-stability, that is, they can be stored for long periods of time without materially advancing toward the insoluble, infusible state. This is a matter of considerable practical importance, since the resin or compound then does not need to be used immediately or very soon after its manufacture nor does it need to be subjected to frequent control tests during storage to determine the extent of any changes that may be taking place in its composition.

I am unable to state with certainty the reason for the unexpected improvement in properties that characterizes resins obtained by reacting to resin formation ingredients comprising essentially an aminotriazine and a preformed poly-(N-carbinol) derivative of a urea, as compared with the ordinary resinous condensation products of an aminotriazine, a urea and an aldehyde, specifically melamine-urea-formaldehyde resins, especially since many chemists believe that during such resin-forming reaction alkylol derivatives, specifically methylol derivatives, of the aminotriazine and urea are formed. However, I believe that the reason for the improvement may be due at least in part to the fact that the reactive —OR groups of the preformed urea containing at least two N-carbinol groups serve as binding anchors between the co-condensing molecules. In other words, the poly-(N-carbinol) derivative functions as a bridging agent between individual molecules of the aminotriazine component thereby to obviate the disadvantages characteristic of the individual component.

In order that those skilled in the art better may understand how the present invention may be carried into effect, the following illustrative examples thereof are given. All parts are by weight.

EXAMPLE 1

This example illustrates the results obtained when, A, one mol melamine is caused to react with three mols preformed dimethylol urea; B, when one mol melamine and three mols urea are caused to react with six mols HCHO; and C, when the molar proportions of reactants of B are caused to react in the presence of an added condensation catalyst, specifically sodium hydroxide. In the B and C portions of this and all other examples, the proportions of urea and formaldehyde are such that if it be assumed that all the formaldehyde combined with the urea to form dimethylol urea in situ, the molar amount of such dimethylol urea then would be substantially the same as the molar amount of preformed dimethylol urea shown in the A parts of the individual examples. The reaction periods and all other conditions were identical in all cases unless otherwise specifically stated.

A

|  | Parts | Mols (approximately) |
| --- | --- | --- |
| Melamine | 126 | 1 |
| Dimethylol urea (preformed) | 360 | 3 | were mixed with 306 parts water and heated under reflux at boiling temperature for 15 minutes. The resulting resin syrup bodied to a transparent resin when heated on a 140° C. hot plate. Intercondensation with a chlorinated acetamide, e. g., mono-, di- or tri-chloroacetamide, causes the potentially reactive (heat-convertible) resinous syrup rapidly to convert to an insoluble, infusible state when subjected to an elevated temperature, e. g., 100° to 200° C.

To 230 parts of the melamine-dimethylol urea resin syrup was added 1 part of a curing reactant, specifically chloroacetamide, followed by refluxing the mixture for 5 minutes to cause the chloroacetamide to intercondense with the resinous partial condensation product. The resulting hot resinous syrup was mixed with 70 parts alpha cellulose in flock form and 0.4 part of a mold lubricant, specifically zinc stearate, to form a molding compound. The wet compound was dried at 68° C. The dried compound was molded at 130° C. under a pressure of 2,000 pounds per square inch, yielding an excellently cured molded article that showed good flow characteristics during molding. The surface appearance also was very good. The molded piece did not disintegrate or show any material change in surface appearance when immersed in boiling water for 15 minutes. On one accelerated test to determine its relative resistance to water, it showed only 2.7% water absorption. (The water absorption is determined by immersing a weighed sample of the molded article for 15 minutes in boiling water, immersing immediately in cold water for 5 minutes, after which the sample is wiped dry, weighed immediately and the percentage increase in weight recorded as the per cent water absorbed.) A molding compound similarly prepared in the absence of chloroacetamide yielded a molded article of less satisfactory cure characteristics as compared with the compound containing the chloroacetamide.

B

|  | Parts | Mols (approximately) |
| --- | --- | --- |
| Melamine | 126 | 1 |
| Urea | 180 | 3 |
| Aqueous solution of formaldehyde (approx. 37.1% HCHO) | 486 | 6 HCHO | were mixed and heated under reflux at boiling temperature for 15 minutes to yield a resinous syrup that gelled upon cooling to room temperature. This syrup bodied to a transparent resin when heated on a 140° C. hot plate. The incorporation of curing reactants into the resinous syrup accelerated its conversion to a hard, infusible resin.

Following the identical procedure and proportions of components described under A with reference to the production of a chloroacetamide-containing syrup, molding compound and molded article, similar compositions were made with this B syrup. A molded piece of apparently good cure characteristics was obtained. However, on an accelerated test to determine its resistance to water, it showed a water absorption of 3.27% as compared with only 2.7% for the corresponding molded piece of A. When chloroacetamide is omitted from the formulation, molded articles of less satisfactory cure characteristics as compared with those made from compounds containing chloroacetamide are obtained.

C

Same formula and procedure were followed as described under B with the exception that the mixture included 0.08 part (0.01% by weight of the mixture) of sodium hydroxide dissolved in 4 parts water. This amount of NaOH was just sufficient to bring the pH of the initial mixture to approximately the same value as the initial mixture of A, that is, to a pH of 8.50 as compared with a pH of 8.42 for the A mixture.

Molding compounds and molded articles were prepared as described under A. A molding compound made from chloroacetamide-containing resin syrup yielded a molded article of apparently good cure characteristics. However, its resistance to water was relatively poor as shown by the fact that it absorbed 5.67% water on an accelerated test for resistance to water as compared with only 2.7% for the corresponding A product. When chloroacetamide was omitted from the formation, a very poorly cured (almost uncured) molded piece was obtained.

EXAMPLE 2

This example illustrates the results obtained when, A, one mol melamine is caused to react with four mols preformed dimethylol urea; B, when one mol melamine and four mols urea are caused to react with eight mols HCHO; and C, when the molar proportions of reactants of B are caused to react in the presence of an added condensation catalyst, specifically sodium hydroxide.

A

|  | Parts | Mols (approximately) |
| --- | --- | --- |
| Melamine | 126 | 1 |
| Dimethylol urea (preformed) | 480 | 4 | were mixed with 410 parts water and heated under reflux for 15 minutes at the boiling temperature of the mass. The resulting syrup showed excellent solution stability. It bodied to a transparent resin when heated on a 140° C. hot plate.

Molding compounds and molded articles were prepared as described under A of Example 1. Molded pieces of approximately the same physical characteristics as the corresponding products of Example 1—A were obtained. The syrup into which 0.435% by weight thereof of chloroacetamide had been intercondensed yielded an excellently cured molded article that showed only 2.62% water absorption. Molding compounds made in the same manner from the chloroacetamide-free resin syrup yielded molded pieces of less satisfactory cure characteristics.

B

|  | Parts | Mols (approximately) |
|---|---|---|
| Melamine | 126 | 1 |
| Urea | 240 | 4 |
| Aqueous solution of formaldehyde (approx. 37.1% HCHO) | 648 | 8 HCHO | were mixed and heated under reflux at boiling temperature for 15 minutes.

A portion of the resulting resin syrup into which 0.435% chloroacetamide had been intercondensed by refluxing the mixture for 5 minutes was made into a molding compound as described under 1—A. A molded article produced from the dried molding compound showed a water absorption of 3.22% as compared with only 2.62% for the corresponding A product of this example.

C

Same formula and procedure were followed as described under B with the exception that the mixture included an amount of sodium hydroxide sufficient to bring the pH of the initial mixture to approximately the same value as the initial mixture of A, that is, a pH of 8.37 as compared with a pH of 8.30 for the A mixture. A molding compound made from the resin syrup into which 0.435% chloroacetamide had been intercondensed yielded a molded article of apparently good cure characteristics but of relatively poor resistance to water. Its water absorption was 6.15% as compared with only 2.62% for the corresponding A product of this example.

EXAMPLE 3

This example illustrates the results obtained when, A, one mol melamine is caused to react with six mols preformed dimethylol urea; B, when one mol melamine and six mols urea are caused to react with twelve mols HCHO; and C, when the molar proportions of reactants of B are caused to react in the presence of an added condensation catalyst, specifically sodium hydroxide.

A

|  | Parts | Mols (approximately) |
|---|---|---|
| Melamine | 126 | 1 |
| Dimethylol urea (preformed) | 720 | 6 | were mixed with 611 parts water and heated under reflux for 15 minutes at boiling temperature. The resulting resinous syrup exhibited excellent time stability against gellation.

Molding compounds and molded articles were prepared as described under A of Example 1. The syrup into which 0.435% by weight thereof of chloroacetamide had been intercondensed yielded fast-curing molding compounds. The molded articles were excellently cured throughout and showed only 2.93% water absorbed on an accelerated water resistance test. Molding compounds made in the same manner from the chloroacetamide-free resin syrup yielded molded pieces of less satisfactory cure characteristics.

B

|  | Parts | Mols (approximately) |
|---|---|---|
| Melamine | 126 | 1 |
| Urea | 360 | 6 |
| Aqueous solution of formaldehyde (approximately 37.1% HCHO) | 972 | 12 HCHO | were mixed and heated under reflux at boiling temperature for 15 minutes to yield a resinous syrup that became an opaque gel upon standing at room temperature.

A portion of the resinous syrup into which 0.435% by weight of a curing reactant, specifically chloroacetamide, had been intercondensed by refluxing the mixture for 5 minutes was made into a molding compound as described under 1—A. A molded piece produced from the dried molding composition showed a water absorption of 4.61% as compared with only 2.93% for the corresponding A product of this example. When chloroacetamide is omitted from the formulation, molded pieces of less satisfactory cure characteristics are obtained.

C

Same formula and procedure were followed as described under B with the exception that the mixture included 0.01% by weight thereof of sodium hydroxide. This amount of NaOH was sufficient to bring the pH of the initial mixture to approximately the same value as the initial mixture of A, that is, to a pH of 8.18 as compared with 8.11 for the A mixture. A molding composition made from the syrup resulting from intercondensing therein 1 part chloroacetamide per 230 parts of the alkaline-catylyzed, potentially reactive partial condensation product yielded a molded article of apparently fair cure characteristics but of low water resistance. Its water absorption was 7.39% as compared with only 2.93% for the corresponding A product.

EXAMPLE 4

This example illustrates the results obtained when, A, one mol melamine is caused to react with eight mols preformed dimethylol urea; B, when one mol melamine and eight mols urea are caused to react with sixteen mols HCHO; and C, when the molar proportions of reactants of B are caused to react in the presence of an added condensation catalyst, specifically sodium hydroxide.

A

|  | Parts | Mols (approximately) |
|---|---|---|
| Melamine | 126 | 1 |
| Dimethylol urea (preformed) | 960 | 8 | were mixed with 815 parts water and heated under reflux for 15 minutes at boiling temperature. Molding compounds and molded articles were prepared as described under A of Example 1. The syrup into which 0.435% by weight thereof of chloroacetamide had been intercondensed yielded molding compounds of good molding characteristics, showing good plastic flow during molding. When tested for water resistance on an accelerated test, the cured molded product showed a water absorption value of 5.52%.

B

|  | Parts | Mols (approximately) |
|---|---|---|
| Melamine | 126 | 1 |
| Urea | 480 | 8 |
| Aqueous solution of formaldehyde (approximately 37.1% HCHO) | 1,296 | 16 HCHO | were mixed and heated under reflux at boiling temperature for 15 minutes. To a portion of the resulting resinous syrup was added 0.435% by weight thereof of chloroacetamide, followed by heating under reflux for 5 minutes to cause the chloroacetamide to intercondense with the melamine-urea-formaldehyde partial condensation product. A molding compound was made from this syrup as described under 1—A. A molded article produced from the dried molding composition showed a water absorption value of 8.82% as compared with 5.52% for a similarly molded piece made from the compound A of this example.

The molding compounds of A and B were subjected to accelerated time stability tests. Samples of each were placed in a 70° C. oven for 17 hours. At the end of this period of time, the A molding compound still showed good flow characteristics during molding and yielded well-cured molded articles with no difficulty whatsoever. In marked contrast, the oven-heated B compound showed practically no plastic flow during molding and yielded a molded piece that was poorly knitted or fused together and of unsatisfactory surface characteristics.

C

Same formula and procedure were followed as described under B with the exception that the mixture included 0.24 part sodium hydroxide in 12 parts water. This amount of NaOH was sufficient to bring the pH of the initial mixture to approximately the same value as the initial mixture of A, that is, to a pH of 8.25 as compared with 8.29 for the A mixture. A molding compound made from the syrup resulting from intercondensing therein 0.435% by weight thereof of chloroacetamide yielded a molded article of mediocre cure and which showed a high water absorption value, namely, 8.07% as compared with 5.52% for the corresponding product of A.

Example 5

Same formula and procedure as described under A of Example 4 with the exception that the period of refluxing the melamine and preformed dimethylol urea was increased from 15 minutes to 90 minutes. Molding compounds made from the chloroacetamide-containing resinous syrup yielded molded articles that showed approximately one-half the water absorption value of the 4—A molded pieces.

Example 6

This example illustrates the results obtained when, A, one mol melamine is caused to react with three mols dimethylol urea in the presence of a condensation catalyst comprising ammonia and sodium hydroxide; and B, when one mol melamine is caused to react with three mols urea and six mols formaldehyde in the presence of the same condensation catalyst as in A.

A

|  | Parts | Mols (approximately) |
|---|---|---|
| Melamine | 126.0 | 1 |
| Dimethylol urea (preformed) | 360.0 | 3 |
| Sodium hydroxide in 10 parts water | 0.2 |  |
| Aqueous ammonia (28% NH₃) | 1.8 |  | were mixed with 302 parts water and heated under reflux for 15 minutes at boiling temperature. The resulting syrup had excellent time- or storage-stability characteristics.

A molding compound and a molded article were prepared from the above syrup, using the same proportions of chloroacetamide, alpha cellulose and zinc stearate and the same procedure as described under A of Example 1 with the exception that the chloroacetamide was not refluxed for 5 minutes with the resin syrup, intercondensation of the chloroacetamide with the resinous partial condensation product taking place, in this case, simultaneously with the drying of the wet molding compound. The molding compound showed good storage-stability characteristics. The molded piece was excellently cured throughout and had a good surface appearance. It successfully withstood immersion in boiling water for 15 minutes without any material change in its appearance. The water absorption value of the molded piece was 3.18%.

B

|  | Parts | Mols (approximately) |
|---|---|---|
| Melamine | 126.0 | 1 |
| Urea | 180.0 | 3 |
| Aqueous solution of formaldehyde (aprox. 37.1% HCHO) | 486.0 | 6 HCHO |
| Sodium hydroxide in 10 parts water | 0.2 |  |
| Aqueous ammonia (28% NH₃) | 1.8 |  | were mixed and heated under reflux at boiling temperature for 15 minutes. A molding compound was made from this syrup following the general procedure and using the same proportions of components as described under A of Example 1. However, as in A of this example, the 5-minute period of reflux of the chloroacetamide with the resin syrup was omitted. The dried molding compound was molded at 130° C. under a pressure of 2,000 pounds per square inch, yielding a molded article of apparently good cure characteristics. However, it showed a water absorption value of 5.26% as compared with only 3.18% for the molded product of A.

From a comparison of the results shown in the above examples, it is clear that, if dimethylol urea does form when urea and formaldehyde are caused to react as described in the B and C parts of the examples, such dimethylol urea is not the equivalent of the preformed dimethylol urea employed as a reactant in forming the resins and thermosetting molding compositions described in the A parts of the examples. This will be seen at once from a comparison of the data on the A, B and C products given in Table I.

Table I

| Example | Percent NaOH in mixture (approx.) | Percent NH₃ in mixture (approx.) | Percent chloroacetamide based on resin syrup (approx.) | pH after mixing and before refluxing | pH after refluxing | Percent water absorption on molded pieces |
|---|---|---|---|---|---|---|
| 1-A | None | None | None | 8.42 | 7.43 | — |
|  | None | None | 0.435 | — | 6.92 | 2.70 |
| 1-B | None | None | None | 6.82 | 7.05 | — |
|  | None | None | 0.435 | — | 6.82 | 3.27 |
| 1-C | 0.01 | None | None | 8.50 | 7.40 | — |
|  | 0.01 | None | 0.435 | — | — | 5.67 |
| 2-A | None | None | None | 8.30 | 7.29 | — |
|  | None | None | 0.435 | — | 6.96 | 2.62 |
| 2-B | None | None | None | 7.05 | 6.95 | — |
|  | None | None | 0.435 | — | 6.69 | 3.22 |
| 2-C | 0.01 | None | None | 8.37 | 6.95 | — |
|  | 0.01 | None | 0.435 | — | — | 6.15 |
| 3-A | None | None | None | 8.11 | 7.48 | — |
|  | None | None | 0.435 | — | 7.06 | 2.93 |
| 3-B | None | None | None | 7.05 | 6.54 | — |
|  | None | None | 0.435 | — | 6.32 | 4.61 |
| 3-C | 0.01 | None | None | 8.18 | 6.86 | — |
|  | 0.01 | None | 0.435 | — | — | 7.30 |
| 4-A | None | None | None | 8.29 | 7.20 | — |
|  | None | None | 0.435 | — | 6.75 | 5.52 |
| 4-B | None | None | None | 6.68 | 6.37 | — |
|  | None | None | 0.435 | — | 6.30 | 8.82 |
| 4-C | 0.012 | None | None | 8.25 | 6.52 | — |
|  | 0.012 | None | 0.435 | — | 6.50 | 8.07 |
| 6-A | 0.01 | 0.62 | None | 10.53 | — | — |
|  | 0.01 | 0.62 | 0.435 | — | — | 3.18 |
| 6-B | 0.01 | 0.62 | None | 9.48 | 7.43 | — |
|  | 0.01 | 0.62 | 0.435 | — | — | 5.26 |

It will be understood, of course, by those skilled in the art that my invention is not limited to the specific components named in the above illustrative examples. Thus, instead of preformed dimethylol urea, other preformed poly-(N-carbinol) derivatives of a urea may be employed.

More specific examples of preformed poly-(N-carbinol), specifically di-(N-carbinol), derivatives of a urea that many be used in producing the new synthetic compositions of this invention are the preformed di-(N-carbinol) derivatives of substituted ureas and their equivalents containing at least two active hydrogen atoms, more particularly compounds containing at least one hydrogen atom attached directly to each amide nitrogen. Thus I may use, for example, preformed di-(N-carbinol), more particularly preformed di-(N-methylol), derivatives of alkyl ureas and thioureas (e. g., methyl, ethyl, etc., ureas and thioureas), aryl ureas and thioureas (e. g., phenyl urea and thiourea, unsymmetrical diphenyl urea and thiourea, etc.), alkyl aryl ureas and thioureas (e. g., unsymmetrical methyl phenyl urea and thiourea, unsymmetrical ethyl phenyl urea and thiourea, etc.), hydroxy ureas and thioureas, ethanol ureas and thioureas, acetyl urea and thiourea, benzoyl urea and thiourea, allyl urea and thiourea, 2-chloroallyl urea and thiourea, di-(phenyl sulfonamide) ureas and thioureas, guanyl urea and thiourea, guanidine, biguanide, aminoguanidine, dicyandiamide, etc.

Likewise, instead of melamine other triazines containing either at least one unsubstituted amidogen group or a plurality of partly substituted amidogen groups may be employed. More specific examples of such triazines are ammeline, ammelide, formoguanamine, 2-amino-1,3,5-triazine and their substitution products; derivatives of melamine, e. g., 2,4,6-trihydrazino-1,3,5-triazine, melam, melon, 2,4,6-triethyltriamino-1,3,5-triazine, 2,4,6-triphenyltriamino-1,3,5-triazine, etc.; nuclearly substituted aminotriazines, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (e. g., 2-methyl-4-amino-6-hydroxy-1,3,5-triazine, etc.), 2-aryl-4-amino-6-hydroxy-1,3,5-triazines (e. g., 2-phenyl-4-amino-6-hydroxy-1,3,5-triazine, etc.) 2-phenyl-p-oxy-4,6-diamino-1,3,5-triazine; poly-amino triazines wherein the hydrogen atoms of one or all of the amino groups are partially substituted by other amino groups, e. g., 2,4-diamino-6-hydrazino-1,3,5-triazine, 2-amino-4,6-dihydrazino-1,3,5-triazine, 2,4,6-trihydrazino-1,3,5-triazine, etc.; poly-amino triazines wherein the hydrogen atoms of one or all of the amino groups are partially substituted by other monovalent substituents (e. g., alkyl, aryl, aralkyl, alkaryl, etc.), for instance 2-amino-4,6-diethylamino-1,3,5-triazine, 4-amino-2,6-diphenylamino-1,3,5-triazine, 2-methylamino-4-amino-6-chloro-1,3,5-triazine, 2,4-diamino-6-phenylamino-1,3,5-triazine, symmetrical trialkyl and triaryl melamines; the amidogen 1,2,3-triazines and the amidogen 1,2,4-triazines, specifically the amino (—NH₂) and the carbamyl (—CONH₂) and the thiocarbamyl (—CSNH₂) 1,2,3- and 1,2,4-triazines. Additional examples of amidogen 1,3,5-triazines are given below:

2-carbamido-4,6-diamino-1,3,5-triazine
2,4-dicarbamido-6-amino-1,3,5-triazine
2,4,6-tricarbamido-1,3,5-triazine
2-thiocarbamido-4,6-diamino-1,3,5-triazine
2,4-dithiocarbamido-6-amino-1,3,5-triazine
2,4,6-trithiocarbamido-1,3,5-triazine
Carbimido and thiocarbimido derivatives of 1,3,5-triazines corresponding to the above carbamido and thiocarbamido derivatives
2-semicarbazido-4,6-diamino-1,3,5-triazine
2,4-di-(semicarbazido)-6-amino-1,3,5-triazine
2,4,6-tri-(semicarbazido)-1,3,5-triazine
2-(para-benzamide)-4,6-diamino-1,3,5-triazine
2,4,6-tri-(para-benzamide)-1,3,5-triazine
2,4-di-(para-benzamide)-6-amino-1,3,5-triazine
2-(ortho-phenylsulfonamide)-4,6-diamino-1,3,5-triazine
2,4-di-(ortho-phenylsulfonamide)-6-amino-1,3,5-triazine
2,4,6-tri-(ortho-phenylsulfonamide)-1,3,5-triazine
Meta-phenylsulfonamide and para-phenylsulfonamide derivatives of 1,3,5-triazines corresponding to the above ortho-phenylsulfonamide derivatives.

Other examples of amidogen triazines are the amidogen 1,2,3-triazines and 1,2,4-triazines corresponding to the above amidogen 1,3,5-triazines. The preferred class of triazines used in carrying the present invention into effect are the 2,4,6-amidogen-1,3,5-triazines.

In many cases other compounds, e. g., aminodiazines, aminodiazoles, urea, thiourea, substituted ureas and their equivalents may be substituted for at least a part of the urea component.

If condensation catalysts are employed to accelerate the condensation reaction between the components, I prefer to use an alkaline or basic condensing agent. Condensation products having excellent storage-stability characteristics can be obtained by causing the condensation reaction to take place in the presence of a condensation catalyst comprising a primary condensation catalyst and a secondary condensation catalyst. As the primary catalyst advantageously may be used a member of the class consisting of nitrogen-containing basic compounds, e. g., ammonia, primary amines (e. g., ethyl amine, propyl amine, etc.), secondary amines (e. g., dipropyl amine, dibutyl amine, etc.) and tertiary amines such as trialkyl (e. g., trimethyl, triethyl, etc.) amines, triaryl (e. g., triphenyl, etc.) amines, etc. The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.). Thus, resinous products of exceptional storage stability may be obtained by causing the initial condensation reaction to be carried out in the presence of a condensation catalyst comprising a relatively small amount of ammonia and a lesser but substantial amount of a fixed alkali, specifically sodium or potassium hydroxide.

In producing my new compositions of matter comprising a reaction product of ingredients comprising essentially an aminotriazine and a preformed poly-(N-carbinol) derivative of a urea, the ratio between the components may be considerably varied but, in general, it is desirable to use at least one mol of the poly-(N-carbinol) derivative for each mol of the aminotriazine employed. Advantageously I effect reaction between an aminotriazine, e. g., melamine and a preformed poly-(N-carbinol) derivative of a urea, specifically preformed dimethylol urea, in the ratio of one mol of the former to from 2 to 10 mols of the latter, excellent results being obtained with from 3 to 8 mols of the latter for each mol of the former. A preferred method of preparing the new compositions of this invention comprises forming a partial condensation product of ingredients comprising essentially melamine and preformed dimethylol urea in the presence of a condensation catalyst comprising ammonia and a fixed alkali, and completing the condensation reaction between the said ingredients in the presence of a curing reactant, specifically a curing reactant comprising chloroacetamide.

From the foregoing description it will be seen that the present invention provides new compositions of matter, more particularly new synthetic resinous compositions, comprising the product of reaction of (1) a chlorinated acetamide and (2) a partial condensation product of ingredients comprising essentially (a) an amidogentriazine wherein the number of hydrogen atoms attached directly to amidogen nitrogen is at least two, and (b) a preformed compound consisting of a urea containing at least two methylol groups attached directly to the nitrogen of the urea.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acrylamide, benzamide, toluene sulfonamide, benzene disulfonamide, benzene trisulfonamide, adipic diamide, phthalamide, etc.; amines such as ethylene diamine, aniline, phenylene diamine, etc; phenols; aminophenols; ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, proteins, protein-aldehyde condensation products, aminodiazine- and aminodiazole-aldehyde condensation products, phenol-aldehyde condensation products, aniline-aldehyde condensation products, furfural condensation products, modified or unmodified, saturated or unsaturated polyhydric alcohol-polybasic acid condensation products, sulfonamide-aldehyde resins, N-carbinol derivatives of aminotriazines, e. g., the methylol melamines, more particularly mono-, di-, tri-, tetra-, penta- and hexa-methylol melamines, water-soluble cellulose derivatives, natural gums and resins such as shellac, rosin, etc., polyvinyl compounds such as polyvinyl alcohol, polyvinyl acetate, polyvinyl acetals, specifically polyvinyl formal, etc. The synthetic compositions of this invention also may be used as modifiers of, or may be modified by, the synthetic compositions disclosed and claimed in various copending applications of mine, for example in copending application Serial No. 371,394 and Serial No. 371,395, which applications were filed December 23, 1940, and are assigned to the same assignee as this invention. More specifically, the compositions of this invention may be used in the form of mixtures with, for example, a condensation product of preformed dimethylol urea and a urea, or a condensation product of preformed dimethylol urea and preformed trimethylol melamine, or with both such condensation products.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a wide variety of shapes under heat or under heat and pressure, more particularly at temperatures of the order of 100° to 200° C. For optimum results I prefer to use temperatures ranging from approximately 120° to 180° C. Molding pressures may be varied considerably, but usually are within the range of 1,000 to 10,000 pounds per square inch, more particularly from 2,000 to 4,000 or 5,000 pounds per square inch.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, and for baking or cementing together mica flakes to make a laminated mica article. They are particularly useful as fire retardants and sizings for cotton, linen and other cellulosic materials. They also may be used as impregnants for electrical coils. The cured products have excellent resistance to heat and water, and have a high dielectric strength and excellent arc resistance.

What I claim as new and desire to secure by Letters Patent of the United States is:

1. A composition of matter comprising the product of reaction of (1) a chlorinated acetamide and (2) a partial condensation product of ingredients comprising essentially (a) an amidogentriazine wherein the number of hydrogen atoms attached directly to amidogen nitrogen is at least two and (b) a preformed compound consisting of a urea containing at least two methylol groups attached directly to the nitrogen of the urea.

2. A composition of matter comprising the resinous product of reaction of (1) a chlorinated acetamide and (2) a partial condensation product of ingredients comprising essentially (a) a triazine containing at least one unsubstituted amidogen group and (b) a preformed compound consisting of a urea containing at least two methylol groups attached directly to the nitrogen of the urea.

3. A composition of matter comprising the resinous product of reaction of (1) a chlorinated acetamide and (2) a partial condensation product of ingredients comprising essentially (a) a triazine containing a plurality of partly substituted amidogen groups and (b) a preformed compound consisting of a urea containing at least two methylol groups attached directly to the nitrogen of the urea.

4. A composition of matter comprising the product of reaction of (1) a chlorinated acetamide and (2) a partial condensation product of ingredients comprising essentially preformed dimethylol urea and a triazine containing at least one unsubstituted amidogen group.

5. A composition of matter comprising the product of reaction of (1) a chlorinated acetamide and (2) a partial condensation product of ingredients comprising essentially preformed dimethylol urea and a triazine containing a plurality of unsubstituted amidogen groups.

6. A synthetic resinous composition comprising the product of reaction of (1) a chlorinated acetamide and (2) a partial condensation product of ingredients comprising as one component a triazine containing a plurality of —NH$_2$ groups and as another component a preformed compound consisting of a urea containing at least two methylol groups attached directly to the nitrogen of the urea, said components of (2) being present in the ratio of one mol of the former to at least one mol of the latter.

7. A heat-curable composition comprising a heat-convertible resinous product of reaction of (1) a chlorinated acetamide and (2) a potentially reactive condensation product of ingredients comprising melamine and preformed dimethylol urea in the ratio of one mol of the former to from 2 to 10 mols of the latter.

8. A product comprising the heat-cured composition of claim 7.

9. The resinous reaction product of (1) a partial condensation product of ingredients comprising melamine and preformed dimethylol urea in the ratio of one mol of the former to from 3 to 8 mols of the latter and (2) a chlorinated acetamide.

10. The resinous reaction product of (1) a partial condensation product of ingredients comprising melamine and preformed dimethylol urea in the ratio of one mol of the former to from 3 to 6 mols of the latter and (2) a small amount of chloroacetamide.

11. A composition comprising the product of reaction of (1) a chlorinated acetamide and (2) an alkaline-catalyzed partial condensation product of melamine and a preformed compound consisting of a urea containing at least two methylol groups attached directly to the nitrogen of the urea.

12. A composition comprising the resinous product obtained by reaction of (1) a chlorinated acetamide and (2) a partial condensation product of ingredients comprising melamine and preformed dimethylol urea in the ratio of one mol of the former to approximately three mols of the latter and in the presence of a condensation catalyst comprising ammonia and a fixed alkali.

13. A product comprising the reaction product of (1) chloroacetamide with (2) a potentially reactive resinous condensation product of melamine and preformed dimethylol urea in the ratio of one mol of the former to from 2 to 10 mols of the latter.

14. A heat-hardenable molding composition comprising a cellulosic filler and the heat-curable resinous product of reaction of (1) a chlorinated acetamide and (2) a potentially reactive condensation product of melamine and preformed dimethylol urea in the ratio of one mol of the former to from 3 to 8 mols of the latter.

15. An article of manufacture comprising the heat-hardened molding composition of claim 14.

16. The method of preparing new synthetic compositions which comprises forming a partial condensation product of ingredients comprising essentially (1) a preformed compound consisting of a urea containing at least two methylol groups attached directly to the nitrogen of the urea and (2) an amidogentriazine, wherein the number of hydrogen atoms attached directly to amidogen nitrogen is at least two and causing a chlorinated acetamide to intercondense with the said partial condensation product.

17. The method of preparing new compositions of matter which comprises forming a partial condensation product of ingredients comprising essentially melamine and preformed dimethylol urea in the presence of a condensation catalyst comprising ammonia and a fixed alkali, and completing the condensation reaction between the said ingredients in the presence of a curing reactant comprising chloroacetamide.

GAETANO F. D'ALELIO.

CERTIFICATE OF CORRECTION.

Patent No. 2,328,424.   August 31, 1943.

GAETANO F. D'ALELIO.

It is hereby certified that error appears in the printed specification of the above numbered patent requiring correction as follows: Page 2, first column, line 62, for "one" read --an--; and second column, line 9, in the table, after "HCHO" insert a closing parenthesis; line 54, for "formation" read --formulation--; page 3, second column, line 50, for "catylyzed" read --catalyzed--; page 7, second column, line 47, after "amidogentriazine" strike out the comma; line 50, same claim, after "two" insert a comma; and that the said Letters Patent should be read with this correction therein that the same may conform to the record of the case in the Patent Office.

Signed and sealed this 2nd day of November, A. D. 1943.

(Seal)   Henry Van Arsdale,
Acting Commissioner of Patents.